3,052,681
REACTION PRODUCTS OF AROMATIC AMINES WITH POLYCYANO HETEROCYCLIC COMPOUNDS
Howard E. Simmons, Jr., Wilmington, Del., assignor to E. I. du Pont de Nemours and Company, Wilmington, Del., a corporation of Delaware
No Drawing. Filed Oct. 6, 1959, Ser. No. 846,071
18 Claims. (Cl. 260—288)

This invention relates to, and has as its principal objects provision of, novel organic compounds, which are useful as pigments, having a plurality of heterocyclic nuclei and a method of preparing the same.

The new products of this invention are broadly represented by the general formula

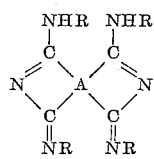

where A is a heterocyclic structure, as defined below, having two separate pairs of adjacent ring carbon atoms in common with each of the two adjoining nitrogen-containing rings, and R is an aromatic carbocyclic or heterocyclic group.

Otherwise stated, the products of this invention contain two divalent heterocyclic groups of the formula

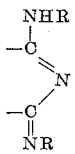

wherein R is an aromatic carbocyclic or heterocyclic radical, the free valences of these groups being attached to two adjacent nuclear carbon atoms of a third heterocyclic structure of the type defined below.

While these compounds will be depicted by the above formulas in the following discussion, the possibility of tautomerism exists, i.e., the amino-imino structure shown above is believed to be in tautomeric equilibrium with the structures

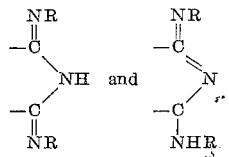

The products of this invention thus contain three heterocyclic structures fused together. They can be broadly described as heterocyclo(c,c')dipyrroles in which the two carbon atoms adjacent to each pyrrole nitrogen bear, respectively, an amino and an imino substituent. In the above name, the letters c and c' indicate, in accordance with the established nomenclature of fused ring compounds, the sides of the pyrrole nuclei which are fused to the central heterocyclic nucleus.

The products of the invention are more specifically defined by the formula

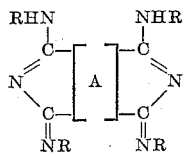

wherein R is an aromatic carbocyclic or heterocyclic group and A represents one of the heterocyclic structures

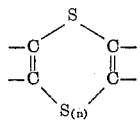

($n$) being an integer from 0 to 1, and

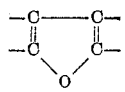

The products of this invention are prepared by heating at a temperature of at least 100° C. a mixture of a heterocyclic compound having two pairs of cyano groups attached to two separate pairs of adjacent nuclear carbon atoms and of an aromatic carbocyclic or heterocyclic primary amine, i.e., an amine in which a primary amino group is bound to a nuclear carbon atom of a cyclic structure having at least two conjugated intracyclic double bonds. The reaction may be represented by the equation:

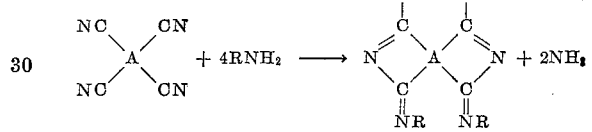

wherein A is a heterocyclic structure as defined above and $RNH_2$ is an aromatic carbocyclic or heterocyclic primary amine.

Suitable heterocyclic tetranitriles for use as starting materials are the tetracyano cyclic sulfides of the formula

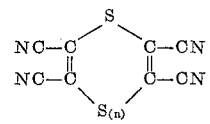

where n is a cardinal number from 0 to 1, i.e., tetracyanothiophene and tetracyano-1,4-dithiin, and tetracyanofuran. Tetracyanothiophene,

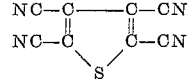

a solid melting at 198° C., is prepared by mild pyrolysis of tetracyano-1,4-dithiin at a temperature in the range of 200–250° C.

Tetracyano-1,4-dithiin

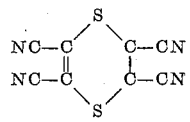

a solid decomposing above 200° C., can be prepared by bringing in contact disodium dimercaptomaleonitrile with a sulfur chloride ($S_2Cl_2$, $SCl_2$, $SOCl_2$, $SO_2Cl_2$) in an anhydrous, liquid organic medium free of active hydrogen which is at least a partial solvent for the reactants and is essentially unreactive towards them, e.g., 1,2-dimethoxyethane. This process is claimed in the copending and coassigned Blomstrom and Smith application S.N. 798,333, filed March 10, 1959.

Tetracyanofuran,

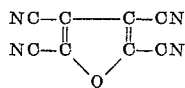

a crystalline solid melting at 124–125° C., may be prepared by the following reaction sequence:

(a) Succinonitrile is condensed with ethyl oxalate in the presence of sodium hydride in benzene to give the disodium salt of diethyl 2,5-dioxo-3,4-dicyanoadipate (I):

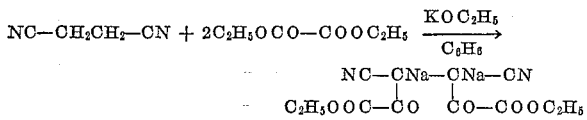

(b) (I) is cyclodehydrated by treatment with thionyl chloride to 2,5-dicarboethoxy-3,4-dicyanofuran (II):

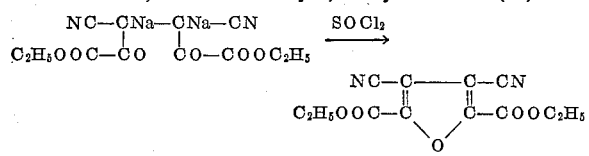

(c) (II) is converted by treatment with ammonia to 2,5-dicarbamoyl-3,4-dicyanofuran (III):

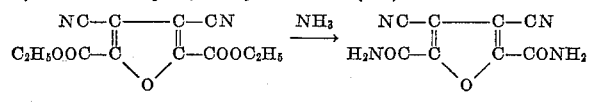

(d) (III) is dehydrated with phosphorus oxychloride in pyridine to tetracyanofuran:

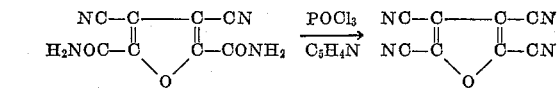

Tetracyanofuran is a new compound described and claimed in coassigned application Ser. No. 846,070, filed herewith.

As the amine reactant there may be used any carbocyclic or heterocyclic primary amine having aromatic character, i.e., in which the amino group is attached to a carbon atom of a nucleus having conjugated intracyclic unsaturation. The amine may be monocyclic or polycyclic. It can bear substituents, since these take no part in the reaction or, even if they are reactive with the cyano groups, interfere only to the extent of decreasing the yield of desired product. Such substituents include, for example, hydrocarbyl, hydrocarbyloxy, halogen, hydroxyl, secondary and tertiary amino groups. The most accessible amines are those having from one to three rings, a total of from 5–14 nuclear atoms and a maximum molecular weight of about 250. The best results are obtained with amines whose basicity corresponds to a pKa value (pKa stands for the negative logarithm of the acidity constant) between about 3.5 and 8.5 when measured at temperatures between 20 and 25° C., and such amines are therefore the preferred ones. Suitable specific amines include aniline, o- and p-chloroaniline, p-anisidine, p-ethoxyaniline, the toluidines, the xylidines, p-aminodiethylaniline, p-aminophenol, α- and β-naphthylamine, 1,4-aminonaphthol, α- and β-aminoanthraquinone, α-, β- and γ-aminopyridine, 2-aminopyrimidine, 2-aminothiazole, 2-aminobenzimidazole, 5-aminotetrazole, α- and β-aminoquinoline, 2-aminobenzothiazole, 2-amino-4-methylthiazole, 2-aminothiophene, 2-aminotriazole, 2-amino-5-nitrothiazole, 3-aminoindole, 2-aminofuran, and 2-aminocarbazole.

A reaction catalyst is not necessary, and satisfactory yields of the condensation products are obtained in the absence of any catalyst. However, it has been found that the reaction can proceed at lower temperatures and/or in shorter times in the presence of anions which are stable under the reaction conditions. Suitable catalysts are the strong inorganic acids such as sulfuric, hydrochloric, phosphoric, nitric and molybdic acids, which are advantageously used in the form of their ammonium salts; and the strong organic acids, having a dissociation constant of at least $1.5 \times 10^{-5}$, such as formic, acetic, chloracetic, dichloracetic, trichloracetic, α-chloropropionic, maleic, oxalic, phthalic, benzoic, o-chlorobenzoic, o-nitrobenzoic, methanesulfonic, ethanesulfonic acids, and the like, and particularly the arenesulfonic acids having from 6–14 carbon atoms, e.g., benzenesulfonic acid, o- and p-toluenesulfonic acid, the xylenesulfonic acids, naphthalene α- and β-sulfonic acid, the naphthalene disulfonic acids, anthracene α- and β-sulfonic acid, diphenyl-4-sulfonic acid, etc. These organic acids can also be used in the form of their ammonium salts. The catalyst is desirably used in amounts between 0.05 and 0.5 mole per mole of tetranitrile reactants. The examples which follow illustrate the carrying out of the process with and without an acidic catalyst.

The reaction is carried out simply by heating under substantially anhydrous conditions an intimate mixture of the two reactants, and of the catalyst if one is used, at a temperature of at least 100° C. The temperature can be as high as the decomposition point of the reactants but it is in general unnecessary to exceed about 275° C. In the absence of a catalyst, it is desirable to operate at a temperature of at least 150° C. since the reaction rate is undesirably slow below that temperature. In the presence of a catalyst of the kind defined above, the temperature range between 100 and 150° C. is the preferred one, although higher temperatures can be used if desired. The preferred overall temperature range is that between 100 and 225° C. Heating is preferably continued until there is no longer any appreciable evolution of ammonia, but it can be discontinued before that point is reached, if desired. To speed up the reaction, it is convenient, but by no means essential, to help the removal of the evolved ammonia by sweeping out the reaction vessel with a stream of gas, such as air or nitrogen, or by operating in an open vessel with a wide mouth.

The reaction proceeds best when the reactants are used in approximately stoichiometric quantities, i.e., about 4 moles of amine per mole of tetranitrile. A slight to moderate excess of the amine can be used, if desired, to insure maximum utilization of the tetranitrile.

A solvent or diluent is not necessary when the reaction is carried out above the melting point of at least one of the reactants, so that adequate contact is insured. However, it is convenient to use a reaction medium, liquid at the operating temperature, which is at least a partial solvent for the reactants, e.g., is able to dissolve them to the extent of at least 1% by weight. For this purpose, there may be used any high boiling, substantially anhydrous, inert organic compound liquid at the reaction temperature, for example, dichlorobenzene, trichlorobenzene, o-dibromobenzene, xylene, durene, biphenyl, tetrahydronaphthalene, diphenyl ether, dibenzyl ether, di-β-ethoxyethyl ether, di-β-butoxyethyl ether, tetramethylene sulfone, and the like. Relatively low boiling solvents can also be used by operating under pressure, although the reaction is more conveniently carried out at or near atmospheric pressure.

The reaction products, i.e., the heterocyclo(c,c')-di(amine-imino)pyrroles, are high melting solids, insoluble or difficultly soluble in the common organic solvents. The product separates from the reaction mixture as a solid, frequently crystalline, from which impurities such as unchanged reactants or reaction medium can be removed by washing or extraction with suitable solvents.

The products of this invention are brightly and intensely colored materials, their color being generally in the range from yellow to deep red. They are characterized by great heat-resistance and chemical inertness. For example, they can be dissolved in cold concentrated sulfuric acid and reprecipitated unchanged from this solution by dilution with water. They are unattacked by most chemicals, including hot water, aqueous alkalies, mineral and vegetable oils, greases, etc.

These products are especially suitable for use as pigments, not only because of the above-mentioned properties of inertness, but because of their excellent light fastness either under natural or artificial light conditions. In this important respect, the products of this invention possess unexpected superiority over the related products obtained by condensation of ammonia or amines with carbocyclic or heterocyclic dinitriles, or with carbocyclic tetranitriles (see British Patent 698,049 and U.S. Patents 2,727,043; 2,739,151; 2,739,154; 2,739,155; and 2,752,346).

For use as pigments, the products of the invention can be compounded with any of the ingredients in general use in the paint and pigments industry, e.g., nondrying or drying oils, thinners, dryers, natural or synthetic resins, etc. They can be used as such or in admixture with extenders, fillers or other organic or inorganic pigments, white or colored. The compositions so obtained are suitable for any of the applications in which pigments are used, e.g., printing inks, protective and decorative coatings on metals, wood, stone, tiles, and the like, floor coverings, rubber and plastic compositions, leather articles, wax and chalk crayons, etc.

The invention is illustrated in greater detail in the following examples, in which parts are by weight.

*Example I*

A mixture of 50 parts of tetracyanothiophene and 163 parts of 2-aminobenzothiazole was charged into a reaction vessel with about 700 parts of 1,2,4-trichlorobenzene as the reaction medium. The reaction vessel was surmounted by a reflux condenser carrying a drying tube filled with calcium chloride. The reaction mixture was stirred and the temperature was raised from 25° C. to 200° C. over a period of about 6 hours. Ammonia evolved during the reaction and a deep red microcrystalline compound precipitated. Stirring and heating at 200° C. were continued for 12 hours, after which the reaction mixture was filtered while still hot and the bright red-orange reaction product was collected. This insoluble product, which amounted to 196 parts, was purified by extraction with boiling benzene, then with 1,2-dimethoxyethane. It melted at 335–337° C. with decomposition. It was insoluble in 30% aqueous sodium hydroxide but dissolved in cold concentrated sulfuric acid to give a deep orange-red solution, from which it reprecipitated unchanged on dilution with water.

Elemental analysis, supported by infrared and ultraviolet spectral analysis, showed that this compound (obtained in 96% yield) was 1,7-bis(benzothiazol-2-ylamino) - 3,5-bis(benzothiazol-2-ylimino)-3,5-dihydrothieno[2,3-c, 4,5-c′]dipyrrole,

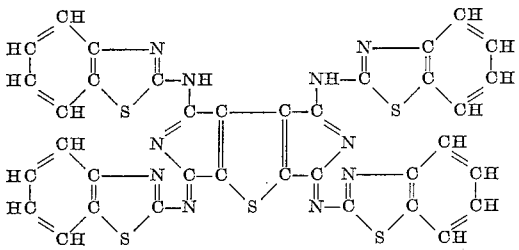

*Analysis.*—Calc'd for $C_{36}H_{18}N_{10}S_5$: C, 57.58; H, 2.42; N, 18.66; S, 21.35. Found: C, 56.86; H, 3.09; N, 20.22; S, 20.80.

A dimethylformamide solution of this pigment showed absorption maxima at 283 and 290 m$\mu$ (absorbance 1.05) and 415 and 435 m$\mu$ (absorbance 1.17). The absorption band had shoulders at 320, 465 and 505 m$\mu$ (absorbance: 0.45, 0.83 and 0.39, respectively).

A small amount of this product was compressed to a pellet and supported on a conical helix of tungsten wire in a high vacuum apparatus, in which glass plates were located about 25 cm. away from the pellet and perpendicular to a line joining the pellet and the plates. The apparatus was evacuated to about 1 micron pressure and the pigment was evaporated by applying an electric current to the tungsten filament. The evaporated pigment deposited on the glass slides as a thin layer. The coated slides were subjected to the intense artificial light of a carbon arc in a Fade-Ometer. After 200 hours' continuous exposure, the pigment showed no fading.

*Example II*

Approximately 1000 parts of the product of Example I was dissolved in 5000 parts of cold concentrated sulfuric acid. The sulfuric acid solution was poured onto a well stirred mixture of cold water and ice. The precipitated pigment was filtered and washed until free of sulfate ion (barium chloride test) without allowing the filter cake to become dry or cracked. The wet filter cake was stored in a tightly stoppered bottle to prevent evaporation and the solids content was determined on a small aliquot. A portion of the filter cake corresponding to 50 parts of pigment on a dry basis was mixed on a glass plate with 100 parts of lithographic varnish, and the mixture was dried in an air stream until the water had evaporated. A portion of the resulting solid ink was left unmodified (Sample A). Another portion (18 parts) was compounded with 294 parts of a paste of titanium dioxide in lithographic varnish (Sample B). Both samples were spread on paper in a form suitable for accelerated exposure to a carbon arc in a Fade-Ometer. The mounted samples were masked in such a way as to get exposures of 24, 48, 72, and 144 hours. The ink of Sample A showed no change on exposure up to 144 hours, when the test was discontinued. The tint in the titanium dioxide of Sample B showed a slight change in color after 24 hours' exposure, the change being in the direction of greater brightness. Following this, no further change in the color of the tint occurred up to the end of the test (144 hours).

*Example III*

A mixture of 184 parts of tetracyanothiophene, 600 parts of 2-aminobenzothiazole and 50 parts of p-toluenesulfonic acid in about 39,000 parts of 1,2,4-trichlorobenzene was stirred while the temperature was raised from 40° C. to 150° C. over a period of 2.5 hours, then held at 150–156° C. for 5.5 hours. The reaction mixture was then cooled to room temperature, diluted with 5 volumes of petroleum ether and filtered. The solid reaction product was purified by thorough washing in suspension in ethyl acetate (twice) and dimethylformamide (twice) and filtered after each washing. It was then washed on the filter with ethyl alcohol, then with diethyl ether, and dried in vacuum. There was obtained 513 parts (68.3% yield) of a bright red product identical with that of Example I.

*Example IV*

A mixture of 184 parts of tetracyanothiophene, 532 parts of 2-aminobenzimidazole and 50 parts of p-toluenesulfonic acid in 39,000 parts of 1,2,4-trichlorobenzene was stirred and heated from room temperature to 142° C. in 1.5 hours, following which the temperature was maintained at 142–149° C. for 2.5 hours. The reaction mixture was cooled, diluted with five volumes of petroleum ether and filtered. The filter cake was washed with ethanol, then with diethyl ether, and dried in vacuum. There was obtained 571 parts (83.8% yield) of a dark red solid, identified by its spectral characteristics as 1,7-bis(benzimidazole - 2 - ylamino) - 3,5 - bis(benzimidazol - 2 - ylimino) - 3,5 - dihydrothieno[2,3-c, 4,5-c']dipyrrole,

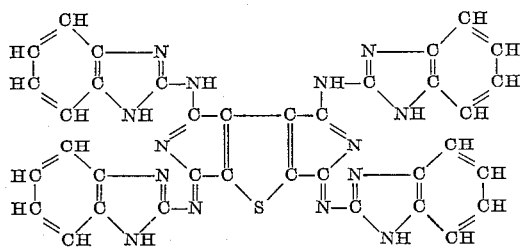

This pigment has an absorption maximum in dimethylformamide at 412 m$\mu$ (molecular extinction coefficient 45,300). The absorption band has a shoulder at 460 m$\mu$, extinction coefficient=33,100.

*Example V*

A mixture of 50 parts of tetracyanothiophene and 134 parts of p-anisidine in about 7000 parts of 1,2,4-trichlorobenzene was heated to reflux (about 215° C.) for 24 hours, during which time ammonia evolved slowly. The reaction mixture was cooled and filtered, yielding 50 parts of a dark colored solid which was washed by extraction with hot benzene, filtered and dried. It was identified by its spectral characteristics as 1,7-bis(p-anisylamino) - 3,5 - bis(p - anisylimino) - 3,5 - dihydrothieno[2,3-c, 4,5-c']dipyrrole,

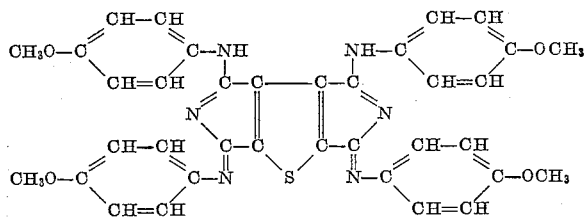

This pigment melts above 300° C. It has an absorption maximum at 410 m$\mu$, with a molecular extinction coefficient of 7300.

*Example VI*

A mixture of 184 parts of tetracyanothiophene, 576 parts of 3-aminoquinoline and 50 parts of p-toluene-sulfonic acid in 39,000 parts of 1,2,4-trichlorobenzene was stirred and heated from room temperature to 143° C. over a period of 3.5 hours. The temperature was maintained at 143–154° C. for an additional 2.5 hours. The reaction mixture was then cooled, poured into two volumes of petroleum ether and filtered. The solid reaction product was extracted with hot ethyl acetate, washed with ethanol and diethyl ether and dried in vacuum. There was thus obtained 80 parts of a dark red-brown solid, identified by its spectral characteristics as 1,7-bis(quinol-3-ylamino)-3,5-bis(quinol-3-ylimino)-3,5-dihydrothieno[2,3-c, 4,5-c']-dipyrrole,

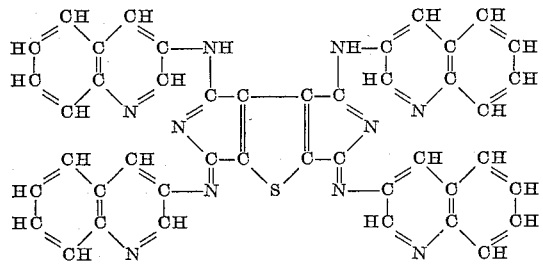

A solution of this pigment in dimethylformamide has absorption maxima at 346 and 414 m$\mu$, with extinction coefficients of 28,200 and 27,600, respectively.

*Example VII*

A mixture of 50 parts of tetracyanothiophene and 158 parts of 2-amino-5-nitrothiazole in 5000 parts of di-$\beta$-ethoxyethyl ether was stirred and heated at 200° C. for 24 hours. The reaction mixture was cooled and filtered. A finely divided, dark-colored solid (130 parts) was collected, extracted with boiling benzene and dried. It was identified by its spectral characteristics as 1,7-bis(5-nitrothiazol-2-ylamino) - 3,5 - bis(5-nitrothiazol-2-ylimino)-3,5-dihydrothieno[2,3-c, 4,5-c']dipyrrole,

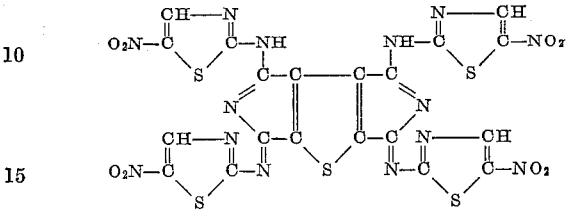

This pigment has an absorption maximum in dimethylformamide at 400$\mu$ with a shoulder at 450$\mu$.

*Example VIII*

A mixture of 216 parts of tetracyano-p-dithiin, 600 parts of 2-aminobenzothiazole and 50 parts of p-toluenesulfonic acid in 39,000 parts of 1,2,4-trichlorobenzene was stirred and heated from room temperature to 150° C. in about 4 hours. Following this, heating was continued at 148–150° C for an additional 2 hours. The reaction mixture was then cooled, diluted with 2 volumes of petroleum ether and filtered. The solid reaction product was suspended in hot ethyl acetate, collected by filtration, washed on the filter with ethyl alcohol, then with diethyl ether, and dried in vacuum. There was obtained 485 parts (62% yield) of a deep red-brown solid, which was identified by its spectral characteristics as 1,7-bis(benzothiazol-2-ylamino) - 3,5 - bis(benzothiazol-2-ylimino)-3,5-dihydro-p-dithiino[2,3-c, 5,6-c']dipyrrole,

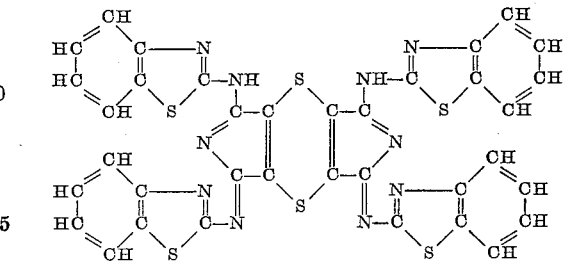

Solutions of this pigment in dimethylformamide have absorption maxima at 373, 390 and 465 m$\mu$, with extinction coefficients of 23,300, 23,500 and 20,500, respectively. The latter absorption band also has shoulders at 500 m$\mu$ and 550 m$\mu$, with extinction coefficients of 16,800 and 8500, respectively.

*Example IX*

The procedure of Example III was essentially duplicated, using the same reactants in the same amounts, except that the reaction catalyst was ammonium molybdate, $(NH_4)_6Mo_7O_{24} \cdot 4H_2O$ (50 parts). There was obtained 450 parts (60% yield) of a red solid identical with the reaction product of Examples I and III.

Similar results were obtained by using, as the reaction catalyst, ammonium nitrate, ammonium sulfate, monobasic ammonium phosphate and ammonium chloride.

*Example X*

A mixture of 184 parts of tetracyanothiophene, 800 parts of 2-aminonaphtho[1,2]thiazole and 50 parts of ammonium chloride in 39,000 parts of 1,2,4-trichlorobenzene was stirred and heated at 145–150° C. for 19 hours. The reaction mixture was diluted with 2 volumes of petroleum ether and the solid reaction product was collected on a filter. This product was extracted with hot ethyl acetate and dimethylformamide, following which it was again filtered, washed on the filter with ethyl alcohol and diethyl ether, and dried. This yielded 550 parts (58% yield) of 1,7 - bis(naphtho[1,2]thiazol - 2-ylamino)-3,5-bis(naphtho[1,2]thiazol - 2 - ylimino)-3,5-dihydrothieno-[2,3-c, 4,5-c']dipyrrole,

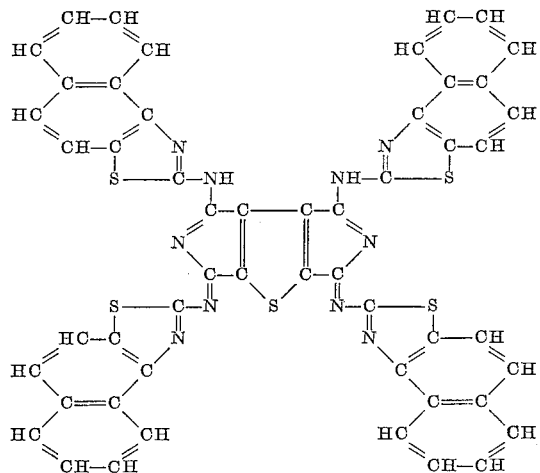

This product is a bright red pigment having an absorption maximum in dimethylformamide solution at 473 mμ with an extinction coefficient of 44,300. The absorption band has shoulders at 414, 460, 500 and 540 mμ with extinction coefficients of 40,700, 39,800, 27,400 and 7400, respectively.

*Example XI*

A mixture of 184 parts of tetracyanothiophene, 776 parts of 2-amino-6-ethoxybenzothiazole and 50 parts of ammonium chloride in 39,000 parts of 1,2,4-trichlorobenzene was heated with stirring at 150–153° C. for 21 hours. The reaction product was isolated and purified as in Example X. There was obtained 758 parts (82% yield) of 1,7 - bis(6-ethoxybenzothiazol-2-ylamino)-3,5-bis(6 - ethoxybenzothiazol-2-ylimino)-3,5-dihydrothieno-[2,3-c, 4,5-c']dipyrrole,

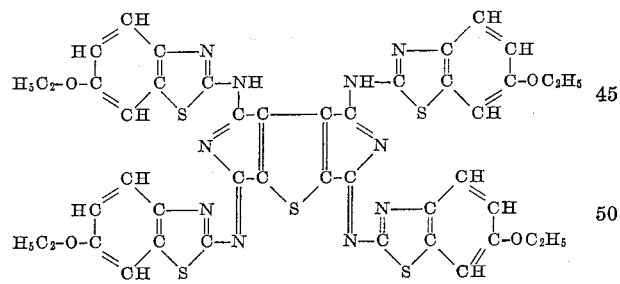

This product is a deep red pigment having an absorption maximum in dimethylformamide solution at 430 mμ with an extinction coefficient of 53,000. The absorption band has shoulders at 410, 453, 490, and 530 mμ, with extinction coefficients of 46,000, 51,700, 35,000, and 15,600, respectively.

*Example XII*

A mixture of 57 parts of tetracyanothiophene, 230 parts of 2-amino-6-chlorobenzothiazole and 20 parts of ammonium chloride in 21,000 parts of 1,2,4-trichlorobenzene was stirred and heated at 147–154° C. for 21 hours. The reaction product was isolated and purified as in Example X. This yielded 125 parts of 1,7-bis(6-chlorobenzothiazol - 2 - ylamino)-3,5-bis(6-chlorobenzothiazol - 2 - ylimino) - 3,5 - dihydrothieno[2,3-c, 4,5-c']-dipyrrole, a red-brown pigment having absorption maxima in dimethylformamide at 412 and 433mμ, with an extinction coefficient of 51,600 and 49,800. The absorption band has shoulders at 387, 470, and 507 mμ, with extinction coefficients of 44,500; 34,800 and 18,100, respectively.

*Example XIII*

A mixture of 168 parts of tetracyanofuran, 600 parts of 2-aminobenzothiazole and 50 parts of ammonium chloride in 39,000 parts of 1,2,4-trichlorobenzene was stirred and heated at 155–160° C. for 19 hours. The solid reaction product was isolated and purified as in Example X. There was obtained 370 parts of a yellow-green pigment, identified by its spectral characteristics as 1,7 - bis(benzothiazol - 2 - ylamino)-3,5-bis(benzothiazol-2-ylimino)-3,5-dihydrofuro[2,3-c, 4,5-c']dipyrrole,

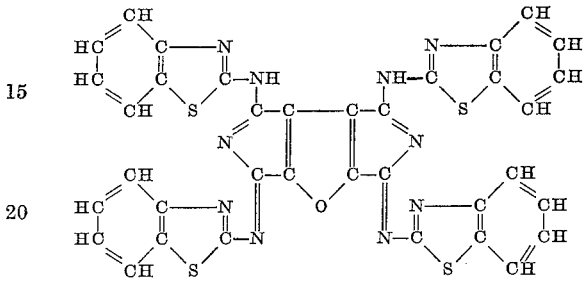

This pigment has absorption maxima in dimethylformamide solution at 450, 420 and 398mμ, with extinction coefficients of 21,200, 45,500, and 48,500, respectively.

The dimethylformamide filtrate obtained in the purification of this pigment yielded, on dilution with 10 volumes of water, an additional 122 parts of less pure product, having an extinction coefficient of 39,800 at 398 mμ.

By following the procedures described in the foregoing examples, the following compounds, all of which are colored, high melting solids suitable for use as pigments, can be prepared by reaction of the named tetranitrile with amines having a primary amino group directly attached to the radicals named below:

From tetracyanothiophene, the compounds having the formula

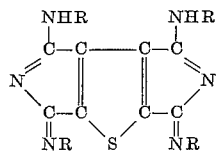

where R is p-tolyl,

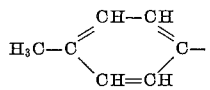

sym.-triazolyl,

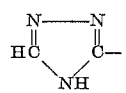

α-pyridyl,

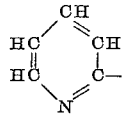

p-diethylaminophenyl,

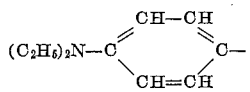

2-pyrimidyl,

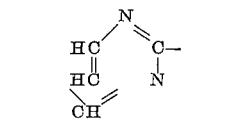

and the like.

From tetracyanofuran, the compounds having the formula where R is 3,5-dimethylphenyl, phenyl, p-chlorophenyl, 2-thiazolyl, and the like.

From tetracyano-1,4-dithiin, the compounds having the formula where R is β-naphthyl, β-anthraquinonyl, 2-pyrimidyl, p-hydroxyphenyl, 3-indolyl, and the like.

Since obvious modifications and equivalents in the invention will be evident to those skilled in the chemical arts, I propose to be bound solely by the appended claims.

The embodiments of the invention in which an exclusive property or privilege is claimed are defined as follows.

I claim:

1. A compound of the formula wherein [A] is a member of the class consisting of and ($n$) being an integer from 0 to 1, inclusive; and R is the monovalent radical of a primary amine $RNH_2$ the basicity of which corresponds to a pKa value between 3.5 and 8.5 at 20–25° C. and the molecular weight of which is less than 250 and is selected from the class consisting of (a) aromatic carbocyclic groups of 1 to 3 six-membered rings and a total of 6 to 14 nuclear carbons and (b) heterocyclic groups of 1 to 3 five-to-six-membered rings with a total of 5 to 13 nuclear atoms including up to four hetero atoms selected from the group consisting of nitrogen, oxygen and sulfur, each ring having conjugated intracyclic unsaturation, each nonannular valence of the nuclear atoms of R being satisfied by a member of the group consisting of hydrogen, lower alkyl, lower alkoxy, nitro, halogen, hydroxyl and lower dialkylamino.

2. 1,7 - bis(benzothiazol - 2 - ylamino)-3,5-bis(benzothiazol - 2-ylimino)-3,5-dihydrothieno[2,3-c, 4,5-c']dipyrrole.

3. 1,7 - bis(benzimidazol - 2 - ylamino)-3,5-bis(benzimidazol-2-ylimino)-3,5-dihydrothieno[2,3-c, 4,5-c']dipyrrole.

4. 1,7 - bis(p-anisylamino)-3,5-bis(p-anisylimino)-3,5-dihydrothieno[2,3-c, 4,5-c']dipyrrole.

5. 1,7 - bis(quinol - 3 - ylamino) - 3,5 - bis(quinol - 3-ylimino)-3,5-dihydrothieno[2,3-c, 4,5-c']dipyrrole.

6. 1,7 - bis(5 - nitrothiazole-2-ylamino)-3,5-bis(5-nitrothiazol - 2-ylimino)-3,5-dihydrothieno[2,3-c, 4,5-c']dipyrrole.

7. 1,7 - bis(benzothiazol - 2 - ylamino)3,5 - bis(benzothiazol-2-ylimino)-3,5-dihydro-p-dithiino[2,3-c, 5,6-c']dipyrrole.

8. 1,7-bis(naphtho[1,2]thiazol - 2 - ylamino)3,5 - bis-(naphtho[1,2]thiazol-2-ylimino)-3,5 - dihydrothieno[2,3-c, 4,5-c']dipyrrole.

9. 1,7-bis(6-ethoxybenzothiazol-2-ylamino) - 3,5 - bis-(6-ethoxybenzothiazol-2-ylimino)-3,5 - dihydrothieno[2,-3-c, 4,5-c']dipyrrole.

10. 1,7-bis(6-chlorobenzothiazol)-2-ylamino)3,5 - bis-(6-chlorobenzothiazol-2-ylimino)-3,5 - dihydrothieno[2,-3-c, 4,5-c']dipyrrole.

11. The method of claim 18 wherein the amine is 2-aminobenzothiazole.

12. The method of claim 18 wherein the amine is 2-aminobenzimidazole.

13. The method of claim 18 wherein the amine is p-anisidine.

14. The method of claim 18 accomplished in the presence of an acidic catalyst.

15. The method of claim 14 wherein the catalyst is an inorganic acid.

16. The method of claim 14 wherein the catalyst is the ammonium salt of an inorganic acid.

17. The method of claim 14 wherein the catalyst is an organic acid having a dissociation constant of at least $1.5 \times 10^{-5}$.

18. The process which comprises heating together, at a temperature of 100–275° C., (1) a member of the group consisting of tetracyanothiophene, tetracyano-1,4-dithiin and tetracyanofuran and (2) a primary amine of the formula $RNH_2$ the basicity of which corresponds to a pKa value between 3.5 and 8.5 at 20–25° C. and the molecular weight of which is less than 250, R being a member of the class consisting of (a) aromatic carbocyclic groups of 1 to 3 six-membered rings and a total of 6 to 14 nuclear carbons and (b) heterocyclic groups of 1 to 3 five-to-six membered rings with a total of 5 to 13 nuclear atoms including up to 4 hetero atoms selected from the group consisting of nitrogen, oxygen and sulfur, each ring having conjugated intracyclic unsaturation, each nonannular valence of the nuclear atoms of R being satisfied by a member of the group consisting of hydrogen, lower alkyl, lower alkoxy, nitro, halogen, hydroxyl and lower dialkylamino.

No references cited.